United States Patent
Le Pera et al.

(10) Patent No.: US 9,678,213 B2
(45) Date of Patent: Jun. 13, 2017

(54) DATA COLLECTION DEVICE AND METHOD FOR THE LOCALISATION OF A SOURCE OF INTERFERENCE

(71) Applicant: EUTELSAT S A, Paris (FR)

(72) Inventors: Alessandro Le Pera, Issy-les-Moulineaux (FR); Hector Fenech, Issy-les-Moulineaux (FR); Sonya Amos, Paris (FR)

(73) Assignee: EUTELSAT S A, Paris (FR)

( * ) Notice: Subject to any disclaimer, the term of this patent is extended or adjusted under 35 U.S.C. 154(b) by 714 days.

(21) Appl. No.: 14/170,309

(22) Filed: Jan. 31, 2014

(65) Prior Publication Data

US 2014/0266881 A1  Sep. 18, 2014

(30) Foreign Application Priority Data

Jan. 31, 2013 (FR) ..................... 13 50841

(51) Int. Cl.
  *G01S 19/21* (2010.01)
  *G01S 3/18* (2006.01)
  *G01S 3/30* (2006.01)
  *G01S 5/04* (2006.01)
  *G01S 19/00* (2010.01)

(52) U.S. Cl.
  CPC ............... *G01S 19/21* (2013.01); *G01S 3/18* (2013.01); *G01S 3/30* (2013.01); *G01S 5/04* (2013.01)

(58) Field of Classification Search
  CPC ..... G01S 3/02; G01S 3/14; G01S 3/16; G01S 3/18; G01S 3/28; G01S 3/30; G01S 5/02; G01S 5/04; G01S 19/01; G01S 19/13; G01S 19/21; G01S 5/12; G01S 5/14; H04B 7/14; H04B 7/15; H04B 7/185; H04B 7/18502; H04B 7/18506; H04B 7/18508; H04B 7/1851; H04B 7/18513
  See application file for complete search history.

(56) References Cited

U.S. PATENT DOCUMENTS

| 3,772,701 A | 11/1973 | Wilkinson |
| 6,147,640 A * | 11/2000 | Wachs ............... H04B 7/18513 342/352 |

(Continued)

FOREIGN PATENT DOCUMENTS

| FR | 2 125 394 | 9/1972 |
| FR | 2 436 402 | 4/1980 |
| FR | 2 819 657 | 7/2002 |

OTHER PUBLICATIONS

Search Report and Written Opinion as issued for French Patent Application No. 1350841, dated Sep. 25, 2013.

*Primary Examiner* — Bernarr Gregory
(74) *Attorney, Agent, or Firm* — Pillsbury Winthrop Shaw Pittman LLP

(57) ABSTRACT

A data collection device carried on board a satellite and making it possible to localize a source of interference, without using neighboring satellites, comprises: a reception device able to receive the frequency on the ground of the interference; at least three antenna points arranged on the satellite so as to be able to receive a radiofrequency signal coming from the target surface; a processor able to determine the amplitude of the interference signal at the level of each of the antenna points; a connection device able to connect successively each of the antenna points to the processor.

12 Claims, 1 Drawing Sheet

(56) References Cited

U.S. PATENT DOCUMENTS

| | | | | |
|---|---|---|---|---|
| 6,339,396 B1* | 1/2002 | Mayersak | ............... | G01S 19/21 |
| | | | | 342/357.34 |
| 6,417,799 B1* | 7/2002 | Aubain | ................... | G01S 5/12 |
| | | | | 342/16 |
| 6,580,915 B1* | 6/2003 | Kroll | ........................ | G01S 5/14 |
| | | | | 455/279.1 |
| 6,583,755 B2* | 6/2003 | Martinerie | ................ | G01S 5/04 |
| | | | | 342/357.48 |
| 6,628,231 B2* | 9/2003 | Mayersak | ............... | G01S 19/21 |
| | | | | 342/357.25 |
| 6,727,840 B1 | 4/2004 | Sullivan | | |
| 6,731,909 B2* | 5/2004 | McLain | ............ | H04B 7/18508 |
| | | | | 455/423 |
| 7,155,168 B2* | 12/2006 | McLain | ............ | H04B 7/18508 |
| | | | | 455/12.1 |
| 7,436,359 B1* | 10/2008 | Rose | ........................ | G01S 5/12 |
| | | | | 342/424 |
| 8,004,459 B2* | 8/2011 | Ho | ........................... | G01S 5/12 |
| | | | | 342/353 |
| 8,446,310 B2* | 5/2013 | Law | ........................ | G01S 19/21 |
| | | | | 342/13 |
| 9,086,471 B2* | 7/2015 | Mengwasser | ............. | G01S 5/12 |
| 2010/0201570 A1* | 8/2010 | Shemar | .................. | G01S 19/21 |
| | | | | 342/357.59 |

\* cited by examiner

DATA COLLECTION DEVICE AND METHOD FOR THE LOCALISATION OF A SOURCE OF INTERFERENCE

CROSS REFERENCES TO RELATED APPLICATIONS

This application claims priority to French Patent Application No. 1350841, filed Jan. 31, 2013, the entire content of which is incorporated herein by reference in its entirety.

FIELD

The present invention relates to a device intended to be carried on board a satellite and making it possible to collect data enabling the localisation of a source of interference.

BACKGROUND

Interferences can appear on satellite communication channels. It is often necessary to detect the source that generates these interferences in order to stop the interference. To do so, the prior art generally uses a device for localisation of the source of interference that is situated on the ground and which uses the data coming from two neighbouring satellites that share a frequency band and which are in communication with the localisation device.

Consequently, it is necessary with the localisation devices of the prior art to have two neighbouring satellites that use the same frequency band to be able to collect the data making it possible to localise a source of interference. The processing of these data is then carried out on the ground, which can pose problems of confidentiality and of security.

SUMMARY

An aspect of the invention aims to overcome the drawbacks of the prior art by proposing a data collection device enabling the localisation of a source of interference which does not require the use of data coming from a neighbouring satellite.

Another aspect of the invention also aims to propose a data collection device enabling the localisation of a source of interference which is intended to be carried on board a satellite.

In yet another aspect of the invention also aims to propose a data collection device for the localisation of a source of interference which is simple and optimised as regards weight and cost.

To do so, according to a first embodiment of the invention, a data collection device is proposed enabling the localisation of a source of interferences in a target surface when the frequency of the interference on the ground is known, the data collection device being intended to be carried on board a satellite, the data collection device comprising:
- a reception device able to receive the frequency on the ground of the interference;
- at least three antenna points arranged on the satellite so as to be able to receive a radiofrequency signal coming from the target surface;
- a processor constructed to determine the amplitude of the interference signal at the level of each of the antenna points;
- connection device constructed to connect each of the antenna points to the processing means.

Thus, unlike data collection devices of the prior art which are intended to be on the ground, the data collection device according to an embodiment of the invention is intended to be carried on board the satellite, which is particularly beneficial in the case of military or governmental satellites since, in this way, the satellite may be totally autonomous.

Furthermore, thanks to the presence of three antenna points on the satellite, the position of the source of interference may be determined without using the data coming from another satellite, which is very beneficial when it is desired to detect the source of interference and when there is no other satellite near to our satellite, or when there is no other satellite that uses the same frequency band as our satellite.

The data collection device according to an embodiment of the invention essentially makes it possible to localise the interference sources that transmit:
- carrier waves, in other words that the interference forms a single spectral line which is superimposed on the communication channel of the satellite;
- modulated signals, for which a modulation is applied to the carrier wave of the interference. This modulation is generally narrow band compared to the communication channel of the satellite, nevertheless, when it is not intentional, it can occupy the whole communication channel of the satellite.
- a signal where the frequency has a slow variation, practically a continuous wave (CW) signal, where the carrier frequency changes at a rhythm of several kHz per second.

According to different embodiments, the target surface may be the entire surface of the earth that is facing the satellite. In this case, the three antenna points are arranged so as to capture an interference wave, whatever its origin on the earth. Nevertheless, it could also be envisaged to only monitor a part of the surface of the earth that is facing the satellite, which would make it possible to have a more precise localisation of the source of interference in the target surface.

According to an embodiment, the antenna points are arranged so as to form an equilateral triangle, which makes it possible to carry out a symmetrical monitoring of the target surface.

In an embodiment, the frequency on the ground of the interference is transmitted to the data collection device by telemetry, such that the reception device of the frequency on the ground of the interference is a telemetric reception device.

According to different embodiments:
- each antenna point may be formed of a horn antenna, which is simpler to realise or then
- the three antenna points may be formed by a single horn antenna that is moved so as to constitute the three antenna points successively, which makes it possible to economise the number of horn antennas used, but which requires means of moving the horn antenna.

Furthermore, if it is desired to increase the precision of the localisation of the source of interference, it is possible to increase the number of antenna points of the data collection device.

According to different embodiments:
- each antenna point is wide band so as to be able to receive a wide range of interference signals;
- each antenna point has a fixed polarisation;
- each antenna point has two polarisation directions. In this case, the amplitude of the interference at the level of each antenna point is determined along each of these polarisation directions, which makes it possible to localise a wider range of interference sources;

each antenna point has a triangular gain curve so as to have a constant gain slope over the whole frequency band covered by the antenna point, which enables a more precise determination of the position of the source of interferences;

each antenna point has a gain curve that has a slope of around 2 dB per degree, with a maximum around 25 dBi, so that the antenna point has a gain of 0 dBi at 13°, which makes it possible to cover the whole of the earth's surface;

each antenna point has a crossed polarisation level greater than or equal to 27 dB, so as not to degrade the precision of localisation of the source of interference;

each antenna point has a thermal and mechanical stability so as to have a precise localisation of the source of interference despite thermal fluctuations or wear over time.

In the case where each antenna point has two polarisation directions, two signals are received by each of the antenna points, each of these signals being able to be processed by the processor so as to determine, in each polarisation direction, the amplitude of the interference signal at the level of each of the antenna points. In this case, the data collection device generates two times more amplitude data than there are antenna points.

According to different embodiments, the processor may comprise as many processing lines as there are signals to be processed, or then they may comprise a single processing line and connection device which make it possible to connect successively each of the outputs of the antenna points to the processing line. The fact of having a single and same processing line to process all of the signals coming from the antenna points makes it possible, apart from an economy of means, to be able to detect potential errors or imprecisions in the measurements and in the calculations more easily, and to be able to calibrate the collection device more easily.

Beneficially, the processor comprises:
an agile filter able to select a target frequency band in the signal received by one of the antenna points and to convert it into a signal having an intermediate frequency band, the target frequency band containing the frequency on the ground of the interference;
a digital processor able to:
convert the signal having an intermediate frequency band into a digital signal and
determine a frequency bin in which lies the frequency of the interference at the level of the satellite;
determine in said frequency bin, for each of the signals received by each of the antenna points, the amplitude of the interference at the level of each of the antenna points.

The agile filter thus makes it possible to select a frequency band that comprises the source of interference so as to be able to analyse it more precisely. To do so, the agile filter converts a signal band in which lies the interference signal into an intermediate frequency signal which may then be digitised and processed so as to determine the amplitude measured for the interference at the level of each antenna point. The position of the source of interference in the target surface may then be determined by triangulation.

Benficially, the amplitude of the interference at the level of each of the antenna points is determined in the two polarisation directions of each of the antenna points, which makes it possible to localise a wider range of interference sources.

Furthermore, in an embodiment, the determination of the frequency bin in which lies the frequency of the interference at the level of the satellite is performed by a rapid Fourier transform, which is simple and has the benefit of being able to be automated. Moreover, it is possible to increase the precision of the rapid Fourier transform by increasing the number of samples used, whereas the sampling frequency remains constant. The rapid Fourier transform makes it possible to apply narrower and narrower successive filters on the digital signal so as to determine a frequency bin of chosen width in which lies the frequency of the interference at the level of the satellite.

Benficially, the data collection device further comprises a transmission device or transmitter able to transmit to a computing device the amplitudes of the interference determined at the level of each of the antenna points.

According to different embodiments:
in a particularly beneficial manner, the computing device may be on the ground, which makes it possible to have a lighter data collection device; when the computing device is on the ground, the transmission device uses telemetry to transmit the amplitudes of the interference determined at the level of each of the antenna points to the computing means;
the computing device may form part of the data collection device and in this case, the data collection device is also a device for localisation of the source of interference. Thus, the satellite may be totally autonomous, which increases its security and its confidentiality.

The computing device is not intended to suggest any limitation as to scope of use or functionality, as the techniques and tools may be implemented in diverse general-purpose or special-purpose computing devices.

According to an embodiment, the computing device is able to determine the position of the source of interference in the target surface by triangulation by means of the amplitudes of the interference signal measured at the level of each of the antenna points, which enables a precise and simple determination of the position of the source of interference.

A second aspect of the invention also relates to the use of amplitudes determined by one or two data collection devices according to the first aspect of the invention to determine the position of a source of interference. In fact, even if a single satellite is necessary to assemble the data necessary for the localisation of a source of interference, the data from two data collection devices, each of them being carried on board a satellite, may be used, to increase the precision of the localisation of the source of interference. Moreover, the fact of using the data from two data collection devices according to the first aspect of the invention makes it possible to measure the exact frequency at which the interference signal is received, in order to be able to apply the frequency localisation method. In practice, the two satellites exploit a different Doppler frequency due to their movement, such that the uplink frequency of the interference is received at a slightly different frequency by the two satellites. The analysis of this difference makes it possible to localise the interference (FDOA). In this case, the data collection devices according to an embodiment of the invention make it possible to increase the number of samples used by making narrower the frequency bin used so as to measure precisely the frequency of the interference at the level of the satellite.

A third aspect of the invention also relates to a data collection method enabling the localisation of a source of interferences in a target surface by means of three antenna points arranged on a satellite so as to be able to receive a radiofrequency signal on the whole of the target surface, the method comprising:

reception of the frequency on the ground of the interference;

reception by each antenna point of a radiofrequency signal comprising the interference signal for which it is wished to localise the source;

determination of the amplitude of the interference at the level of each of the antenna points.

To implement the data collection method enabling the localisation of the source of interference, the interference is firstly received on the ground. One then detects whether it is a harmful interference or not. In the case where it is a harmful interference, its frequency is measured on the ground and one determines at what frequency the interference signal will be received at the level of the satellite. In other words, a station at ground level has to detect the interference signal and control the device at the level of the satellite so that it determines the frequency of the interference at the level of the satellite.

According to an embodiment, the step of determination of the amplitude of the interference at the level of each of the antenna points comprises:

selection in the signal received by the first antenna point of a target frequency band containing the frequency on the ground of the interference;

conversion of this target frequency band into a signal having an intermediate frequency band;

digitisation of the signal having an intermediate frequency band;

determination of a frequency bin in which lies the frequency of the interference at the level of the satellite;

determination, in said frequency bin, and for each of the signals received by each of the antenna points, of the amplitude of the interference at the level of each of the antenna points.

Beneficially, the target frequency band has a width of 1 MHz, which makes it possible, knowing the frequency on the ground of the interference, to be sure to select the frequency at the level of the satellite of the interference, while only keeping a small quantity of the signal in memory.

Beneficially, the step of determination of a frequency bin in which lies the frequency of the interference at the level of the satellite is performed by a rapid Fourier transform.

A fourth aspect of the invention also relates to a method for localisation of a source of interference in a target surface by triangulation using the amplitudes determined at the level of each of the antenna points by means of a method according to the third aspect of the invention.

BRIEF DESCRIPTION OF DRAWINGS

Other characteristics and advantages of the invention will become clear on reading the detailed description that follows, with reference to the appended figures, which illustrate.

For greater clarity, identical or similar elements are marked by identical reference signs in all of the figures.

DETAILED DESCRIPTION

Figure 1:
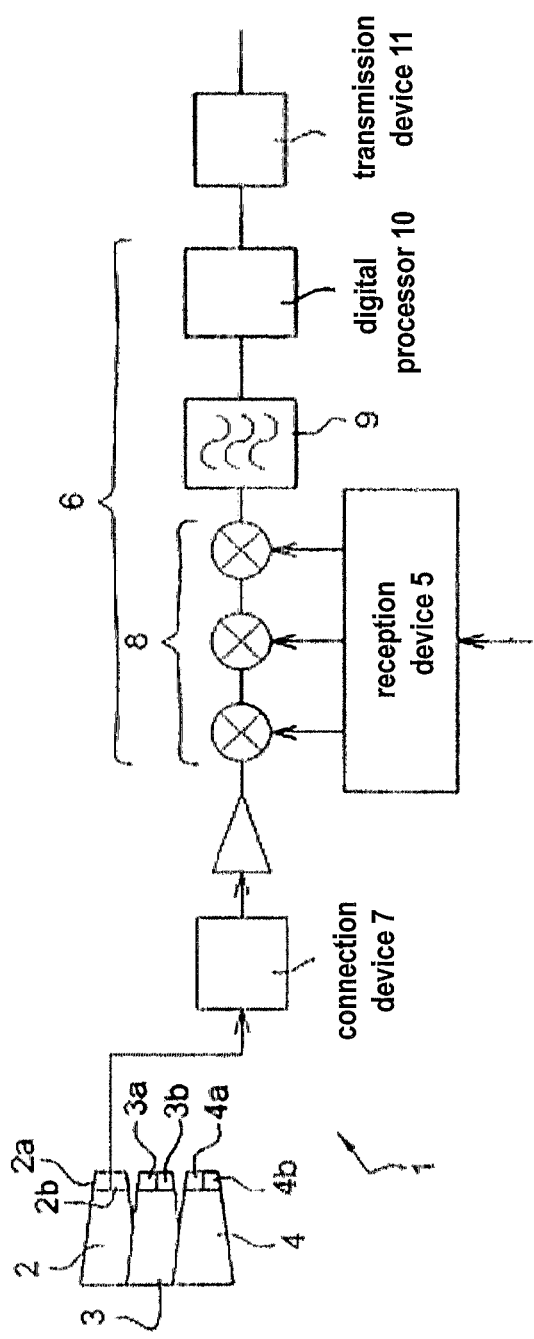
FIG. 1, a schematic representation of a device according to an embodiment of the invention.

FIG. 1 represents in a schematic manner a data collection device 1 carried on board a satellite for the localisation of a source of interference in a target surface according to an embodiment of the invention. In this embodiment, the target surface corresponds to the whole of the surface of the earth that is facing the satellite.

The device 1 is carried on board a satellite. The device 1 comprises:

a reception device 5 able to receive the frequency on the ground of the interference;

at least three antenna points 2, 3, 4 arranged on the satellite so as to be able to receive a radiofrequency signal coming from the target surface;

a processor 6 able to determine the amplitude of the interference signal at the level of each of the antenna points 2, 3, 4;

a connection device 7 able to connect successively each of the antenna points to the processing means 6.

In this embodiment, the three antenna points 2, 3, 4 are each constituted of a horn antenna. Nevertheless, the invention is not limited to the use of horn antennas, nor to the layout of the antennas 2, 3, 4 presented here. These three horn antennas are assembled rigidly on the satellite so as to illuminate the whole of the surface of the earth as may be seen in FIG. 3, which represents a gain mapping of the antenna points. The three antenna points form an equilateral triangle, each antenna point being arranged on one of the summits of the equilateral triangle.

Figure 2:
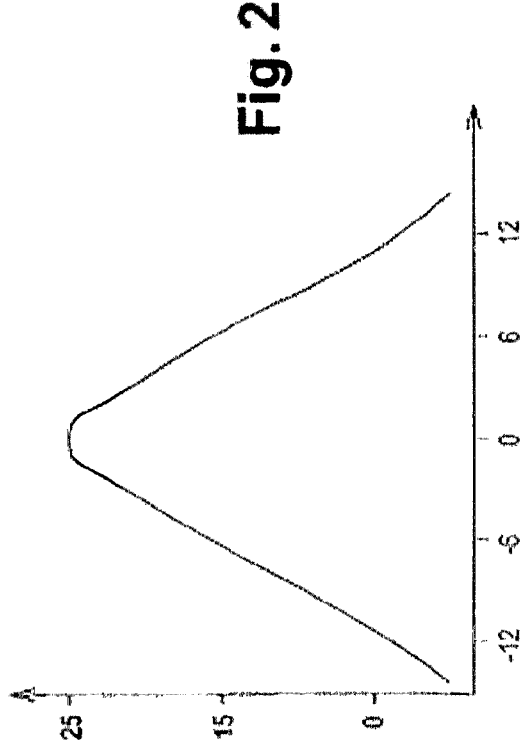
FIG. 2, a gain curve of the antenna points used in the device of FIG. 1.

The gain figure of each of these antenna points 2, 3, 4 is represented in FIG. 2. Each antenna point has a wide band reception spectrum in order to be able to receive a wide range of interference signals, such as for example signals of the Ku or "Kurz-unten" band, or the "Kurtz-above" band.

Furthermore, each antenna point has a fixed polarisation. In an embodiment, each antenna point has a double polarisation direction so as to be capable of localising interference sources along two polarisation directions. Consequently, each antenna point generates two output signals: a first signal along its first polarisation direction, and a second signal along its second polarisation direction. The first polarisation direction is the same in the three antenna points, in the same way as the second polarisation direction is the same in the three antenna points.

To obtain a double polarisation, the horn antennas may be supplied by orthomode transducers OMT that split the signal and enable the formation of the orthogonal polarisation. It could also be envisaged according to another embodiment to supply the horn antennas by a polariser, also known as orthomode junction or OMJ, so as to obtain a circular polarisation.

Figure 3:
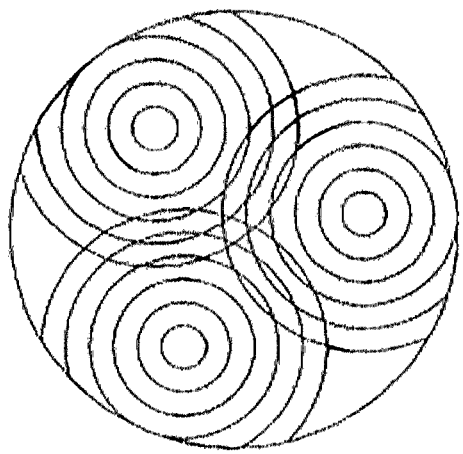
FIG. 3, a gain mapping of the antenna points of the device of FIG. 1.

In an embodiment, each antenna point has a triangular and constant gain curve as a function of the frequency, as represented in FIG. 2, so that the gain is constant for a given angular aperture. The gain curve represented in FIG. 2 is provided uniquely by way of illustration and the invention is not limited to this type of gain curve. Nevertheless, it is desirable to know and reproduce the gain curve by the three horn antennas. The gain curve has a maximum close to 25 dBi, and a slope of each side of this maximum of around 2 dB per degree so that each antenna point can have a gain of 0 dBi for an angular aperture of 13°, which corresponds to the coverage of the earth. Thus, by using these three antenna points arranged according to an equilateral triangle, the gain lines represented in FIG. 3 are obtained.

Furthermore, in an embodiment, each antenna point has a crossed polarisation level greater than or equal to 27 dB so as not to degrade the precision of the measurement. Moreover, each of the horn antennas is thermally and mechanically stable. Moreover, it is desirable that the potential evolutions of performances in terms of gain of the three horn antennas takes place in the same sense and in the same proportions so that the determination of the position of the source of interference remains precise.

Furthermore, each antenna point 2, 3, 4 has two outputs 2a, 2b, 3a, 3b, 4a, 4b, one for each polarisation direction and a filter is arranged on each of the outputs of the polariser or the OMT (orthomode transducer) arrangement of each of the horn antennas.

The connection device 7 is laid out so as to be able to connect successively the two outputs 2a, 2b, 3a, 3b, 4a, 4b of each of the antenna points 2, 3, 4 to the processor. Thus, the processor 6 may process successively the two output signals of each of the three antenna points 2, 3, 4. Consequently, thanks to the connection device 7, the same processor 6 can process the six signals generated by the three antenna points 2, 3, 4.

The processor 6 comprises:
an agile filter 8;
a distortion filter 9 of the signal;
a digital processor 10.

The agile filter 8 makes it possible to select a target frequency band centred around the frequency on the ground of the interference in the signal received by one of the antenna points. This signal is then converted into a signal that can be processed by the digital processing means 10. To do so, the target frequency band is converted into an intermediate frequency band. The processor 6, including the filters 8 and 9 and digital processor 10, can be encoded with machine readable/executable instructions to perform their intended function(s). The machine readable/executable instructions can be stored in a computer readable medium (e.g. a memory of the processor(s)).

More precisely, in this embodiment, the agile filter 8 makes it possible to select in one of the signals received by one of the antenna points a frequency band of 1 Mhz that contains the frequency on the ground of the interference. In an embodiment, the frequency band of 1 MHz is centred around the frequency on the ground of the interference. This frequency band of 1 MHz may lie anywhere in the frequency spectrum. In fact it may lie in the communication channels of the satellite or outside, in order to be able to localise any source of interference, including interference sources for neighbouring satellites. This frequency band is then converted into a signal on which a narrow band filtering may be applied. To do so, the conversion takes place in three steps:

firstly, a first agile conversion converts the frequency channel of interest into a high intermediate frequency signal. For example, if a signal Ku FSS of frequency comprised between 13 and 14.5 GHz arrives, a channel of 33 MHz may be converted into a frequency Ku comprised between 10.95 and 11.70 GHz so as to be able to be filtered by conventional technologies. The agile filter is capable of selecting any band of 33 MHz width in the input signal;

once this first conversion has been carried out, a second conversion is carried out so as to have a low intermediate frequency signal that may be filtered in narrow band. To do so, a conversion in two steps is performed: the first conversion step is agile in order to select 1 MHz in the channel of 33 MHz selected at the preceding step. The second conversion step is fixed and it makes it possible to convert the 1 MHz signal into a signal at a frequency at which the sampling can take place.

Moreover, in an embodiment, a proper image rejection filtering is applied during each conversion step so as not to degrade the signal of interest and thus not to reduce the precision of the localisation of the source of interference.

The digital processor 10 then makes it possible to determine the amplitude of the interference at the level of each of the antenna points and along each of the polarisation directions. To do so, the digital processor 10 is able to:

convert the signal having an intermediate frequency band into a digital signal and apply successive filters on the digital signal so as to determine the frequency bin in which lies the frequency of the interference at the level of the satellite;

determine in said frequency bin, for each of the signals received by each of the antenna points, the amplitude of the interference at the level of each of the antenna points.

More precisely, in this embodiment, the digital processor firstly carries out the sampling of the analogue signal at an analogue digital conversion and applies a rapid Fourier transform. The expression of a rapid Fourier transform is given by:

$$X_k = \sum_{n=0}^{N-1} x_n \cdot e^{-\frac{2\pi i}{N}kn}$$

Where N is the number of samples accumulated to perform the Fourier transform and K is the frequency bin considered. The rapid Fourier transform is particularly beneficial because it makes it possible to automate the determination of the amplitude at the level of each of the antenna points. Moreover, the precision of the determination of the amplitude may be chosen by reducing the width of the frequency bin obtained at the end of digital processing. To do so, the number of samples has to be increased, which may be carried out by increasing the accumulation time. Nevertheless, the duration of determination of the amplitude should not be too long so that the interference can be considered as stationary. According to an embodiment, the precision of the measurement is greater than 0.1 dB.

Thus, according to an embodiment of the invention, a first signal from a first of the antenna points is processed by the agile filter then by the digital processor so as to determine the frequency bin in which lies the frequency of the interference at the level of the satellite. Once this frequency bin has been determined, it may be used to determine the amplitude of the interference at the level of this first antenna point and along this first polarisation direction. Moreover, for the other antenna points and for the other polarisation direction of the same antenna point, one can place oneself directly in this frequency bin to determine the amplitude of the interference, without having to determine again this frequency bin. In other words, the first measurement of the interference signal makes it possible to:

determine the exact frequency of the interference signal at the level of the satellite;

determine the amplitude of the first signal;

determine the frequency bin in which lies the frequency of the interference at the level of the satellite and the amplitude of the interference at the level of this first antenna point.

Once the amplitudes at the level of each antenna point and along each polarisation direction have been determined, they may be used to calculate the position of the source of interference in the target surface by triangulation. This calculation may take place directly inside the data collection device carried on board the satellite, or then it may beneficially take place inside additional computing device(s), which may for example be on earth. In this case, the calculated amplitudes are transmitted to these additional computing device(s), for example by telemetry, by transmission device 11.

In order to improve the precision of the localisation of the source of interference, it is possible to calibrate the device according to the invention. This calibration may take place inside the data collection device. To do so, a calibration source of interference may for example transmit so that its signal is received by the three antenna points and the amplitude of this interference is measured independently by the three antenna points. The position of the source of interference is then calculated and compared with the real position of the source of interference. The constituent elements of the data collection device are then adjusted so as to improve the precision of the localisation of the source of interference.

Another calibration solution may consist in sending a pilot signal of known frequency and of known position to the data collection device.

It will be appreciated that the invention is not limited to the embodiments described with reference to the figures and variants could be envisaged without going beyond the scope of the invention. Thus, the number of antenna points may be increased so as to increase the precision of the measurement. A star shaped arrangement in which a central beam would be surrounded by three beams transmitted by three horn antennas or more could also be used. For example, five horn antennas could be used, one of said horn antennas being arranged at the centre of a square formed by the four other horn antennas.

It is also possible to reduce the target surface to increase the measurement precision.

Furthermore, the preceding solution has been conceived in order to achieve a weight saving while having a simple configuration. Nevertheless, other configurations could be adopted without going beyond the scope of the invention. Thus, in the solution detailed previously, the device covers the whole of the earth. Nevertheless, it could also be envisaged to have several directional beams that use an increased gain. In this case, as in the case described previously, the gain curve of the horn antennas should be known and reproducible to enable precise calculations. If it is desired to cover the whole of the earth, a steering system (also known as "gimballing system") is applied to all of the horn antennas. Gimballing systems are known and may be mounted on a mounting support whereas a base plate supports the supply system.

According to another embodiment, it could also be envisaged to use a reflector. The gimballing system could then be applied to the reflector, or to all of the antennas.

Thus, the different embodiments of the invention enable the scanning of the source of interference. Furthermore, in order to have a light device, the reflector may have beneficially an aperture of small dimensions.

Furthermore, a processing line could also be used for each output of each antenna point, so as to be able to carry out all of the determinations of amplitudes simultaneously, which would also increase the precision of the measurement. Another possible improvement would be to increase the width of the frequency band selected by the agile filter to several megahertz so as to be able to detect modulated interferences.

Furthermore, it could also be possible to envisage using the amplitudes determined by several data collection devices according to the invention, said data collection being carried on board different satellites, to determine the position of the source of interference in a more precise manner.

Having described and illustrated the principles of the invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

The devices, processors or processing devices described herein may be configured to execute one or more sequences of one or more instructions contained in a main memory or a computer readable medium. Execution of the sequences of instructions contained in a main memory or a computer readable medium causes the processor to perform at least some of the process steps described herein. One or more processors in a multi-processing arrangement may also be employed to execute the sequences of instructions contained in a main memory. In alternative embodiments, hard-wired circuitry may be used in place of or in combination with software instructions. Thus, embodiments are not limited to any specific combination of hardware circuitry and software.

The term "computer readable medium" as used herein refers to any medium that participates in providing instructions to a processor for execution. Such a medium may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor for execution.

The invention claimed is:

1. A data collection device enabling the localisation of a source of interference in a target surface when the frequency of the interference on the ground is known, the data collection device configured to be carried on board a satellite, the data collection device comprising:
   a reception device configured to receive the frequency on the ground of the interference;
   at least three antenna points arranged on the satellite so as to receive a radio frequency signal coming from the target surface;
   a processor configured to determine the amplitude of the interference signal at the level of each of the antenna points; and
   a connection device configured to connect each of the antenna points to the processor,
   wherein the processor comprises:
     an agile filter configured to select a target frequency band in the signal received by one of the antenna points and to convert it into a signal having an intermediate frequency band, the target frequency band containing the frequency on the ground of the interference; and a digital processor configured to:
convert the signal having an intermediate frequency band into a digital signal;
determine a frequency bin in which lies the frequency of the interference at the level of the satellite; and
determine, in said frequency bin, for each of the signals received by each of the antenna points, the amplitude of the interference at the level of each of the antenna points.

2. The data collection device according to claim 1, further comprising transmission device configured to transmit to a computing device the amplitudes of the interference determined at the level of each of the antenna points.

3. The data collection device according to claim 1, further comprising a computing device configured to determine the position of the source of interference in the target surface by triangulation using amplitudes of the interference signal measured at the level of each of the antenna points.

4. The data collection device according to claim 1, wherein each antenna point has a triangular gain curve.

5. The data collection device according to claim 1, wherein each antenna point has a crossed polarisation level greater than or equal to 27 dB.

6. The data collection device according to claim 1, wherein each antenna point has two polarisation directions.

7. The data collection device according to claim 6, wherein the amplitude of the interference at the level of each of the antenna points is determined in the two polarisation directions of each of the antenna points.

8. The data collection device according to claim 1, wherein each antenna point is constituted of a horn antenna.

9. A method for determining a position of a source of interference in a target surface using amplitudes determined by one or two data collection devices that are configured to be carried on board a satellite, the method comprising:
receiving, by a reception device, a frequency on the ground of the interference;
arranging at least three antenna points on the satellite so as to receive a radio frequency signal coming from the target surface;
determining, by a processor, the amplitude of the interference signal at the level of each of the antenna points; and
connecting, by a connection device, each of the antenna points to the processor, wherein the determining comprises
selecting in the signal received by one of the antenna points of a target frequency band containing the frequency on the ground of the interference;
converting the target frequency band into a signal having an intermediate frequency band;
digitising the signal having an intermediate frequency band;
determining a frequency bin in which lies the frequency of the interference at the level of the satellite; and
determining, in said frequency bin and for each of the signals received by each of the antenna points, of the amplitude of the interference at the level of each of the antenna points.

10. A data collection method enabling the localisation of a source of interferences in a target surface by means of three antenna points arranged on a satellite so as to receive a radiofrequency signal on the whole of the target surface, the method comprising:
receiving the frequency on the ground of the interference;
receiving by each antenna point of a radiofrequency signal comprising the interference signal for which it is desired to localise the source; and
determining the amplitude of the interference at the level of each of the antenna points,
wherein the determining comprises:
selecting in the signal received by the first antenna point of a target frequency band containing the frequency on the ground of the interference;
converting the target frequency band into a signal having an intermediate frequency band;
digitising the signal having an intermediate frequency band;
determining a frequency bin in which lies the frequency of the interference at the level of the satellite; and
determining, in said frequency bin and for each of the signals received by each of the antenna points, of the amplitude of the interference at the level of each of the antenna points.

11. The method according to claim 10, wherein determining a frequency bin in which lies the frequency of the interference at the level of the satellite is carried out by a rapid Fourier transform.

12. The method according to claim 10, further comprising determining the position of the source of interference in the target surface by triangulation using the amplitudes of the interference signal measured at the level of each of the antenna points.

* * * * *